US012703089B2

(12) United States Patent
Elliott et al.

(10) Patent No.: US 12,703,089 B2
(45) Date of Patent: Aug. 11, 2026

(54) ROBOT LEARNING

(71) Applicant: NVIDIA CORPORATION, Santa Clara, CA (US)

(72) Inventors: David J. Elliott, San Jose, CA (US); Gordon Grigor, San Francisco, CA (US); Arun Shamanna Lakshmi, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 128 days.

(21) Appl. No.: 18/509,124

(22) Filed: Nov. 14, 2023

(65) Prior Publication Data

US 2025/0153353 A1 May 15, 2025

(51) Int. Cl.
*B25J 9/16* (2006.01)
*B25J 11/00* (2006.01)

(52) U.S. Cl.
CPC ............. *B25J 9/163* (2013.01); *B25J 9/1694* (2013.01); *B25J 11/008* (2013.01)

(58) Field of Classification Search
CPC ......... B25J 9/163; B25J 9/1694; B25J 11/008
See application file for complete search history.

(56) References Cited

U.S. PATENT DOCUMENTS 11,351,680 B1 * 6/2022 Rosenberg ........... B25J 19/0095
11,685,045 B1 * 6/2023 Herzog .................... B25J 9/161 700/250
12,099,357 B1 * 9/2024 Ebrahimi Afrouzi ........................ G05D 1/0214
2019/0272725 A1 * 9/2019 Viklund ................. G16H 20/10
2020/0026289 A1 * 1/2020 Alvarez .................. G06F 16/27
2022/0197306 A1 * 6/2022 Cella ...................... B33Y 50/02
2022/0314435 A1 * 10/2022 Wales ...................... B25J 19/02
2022/0314448 A1 * 10/2022 Wales .................... B25J 9/1674
2024/0398479 A1 * 12/2024 Roh ....................... A61B 34/10
2025/0091202 A1 * 3/2025 Okuda ..................... B25J 9/163
2025/0104693 A1 * 3/2025 Papayiannis ............ G10L 13/10
2025/0111187 A1 * 4/2025 Scheepens ........... G06N 3/0455
2025/0138556 A1 * 5/2025 Amer ....................... G05D 1/69
2025/0148399 A1 * 5/2025 Mori ........................ B25J 13/00

* cited by examiner

*Primary Examiner* — Sohana Tanju Khayer
(74) *Attorney, Agent, or Firm* — Squire Patton Boggs LLP; Sarah Mirza

(57) ABSTRACT

Systems and techniques to improve a robotics control application are described herein. In at least one embodiment, event information is generated by one or more robots performing a mission. The event information indicates one or more determinations made by the one or more robots. The event information is stored in a log, and the stored event information can be used to simulate the generating of decisions to control the one or more robots.

20 Claims, 9 Drawing Sheets

ROBOT LEARNING

TECHNICAL FIELD

Embodiments of the present disclosure relate generally to computer science and robotics and, more specifically, to techniques for replaying and learning from events in robotic systems and applications.

BACKGROUND

Robots are being increasingly used to perform tasks automatically or autonomously in various environments. One approach for controlling a robot is to process sensor data that is acquired by the robot using a robotics control application. Given such sensor data, the robotics control application generates decisions for controlling movements of the robot. For example, a LiDAR (light detection and ranging) feed could be processed to detect obstacles in the path of a robot, and the robot can be controlled to avoid the detected obstacles.

One drawback of the above approach for controlling a robot is the robotics control application can oftentimes be difficult to debug or improve. In order to debug the robotics control application when the robot fails to perform a mission successfully, the failure is typically reproduced using the original sensor data so that a cause of the failure can be identified. However, the original sensor data, such as LiDAR data feeds, can be very large in size and, therefore, impractical to store for extended periods of time. In addition, timing information associated with the sensor data generally needs to be measured very precisely in order to reproduce the failure using the sensor data. Due to the difficulty of storing sensor data that is very large in size and of measuring timing information very precisely, robotics mission failures oftentimes cannot be reproduced in a sufficiently accurate manner to debug or otherwise improve a robotics control application.

As the foregoing illustrates, what is needed in the art are more effective techniques for improving robotics control applications.

DETAILED DESCRIPTION

Figure 1:
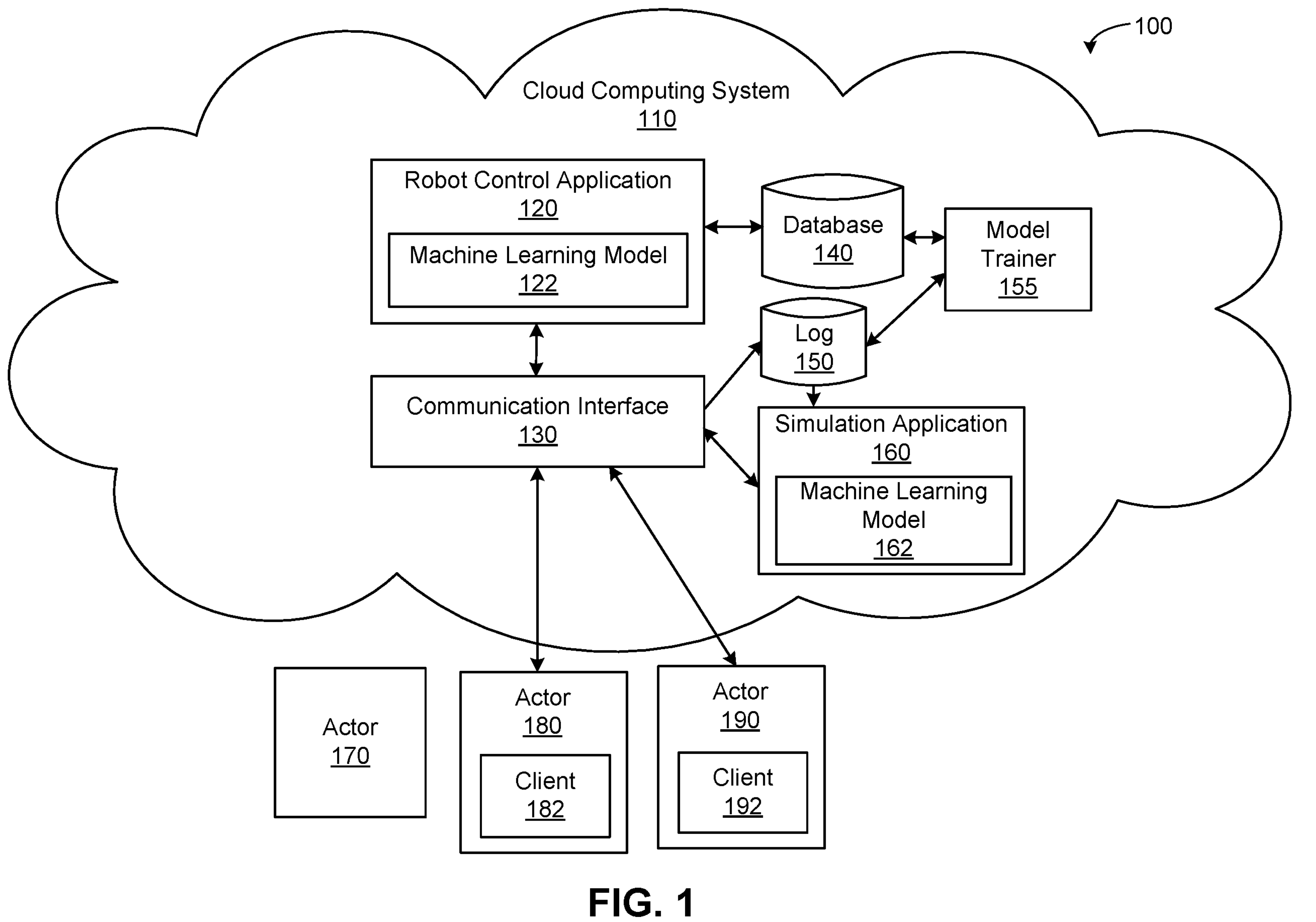
FIG. 1 illustrates a block diagram of a system configured to implement one or more aspects of at least one embodiment.

Embodiments of the present disclosure provide techniques for improving robotics control applications. In at least one embodiment, a communication interface between one or more robots and a robotics control application receives event information from different actors, such as the one or more robots, that participate in a robotics mission. Each event includes a timestamp and updated information associated with the actor. The communication interface persists the event information in a log. The logged events can be used to replay decisions made by the robotics control application via simulations in which the events are transmitted again to the communication interface, which forwards those events to the robotics control application. In turn, the robotics control application generates decisions that can be analyzed to debug and/or otherwise modify the robotics control application. The simulation can begin from an initial state of the actors or a known state to which events are added. In at least one embodiment, a machine learning model can be trained to detect errors that cause mission failures using training data that includes the logged event information and the statuses of missions. In addition, in at least one embodiment, a machine learning model can be trained to generate robot control decisions using training data that includes the logged event information and the statuses of missions.

The techniques for improving robotics control applications have many real-world applications. For example, those techniques could be used to improve a robotics control application that controls one or more robots in a factory, warehouse, or other industrial environment. As another example, those techniques could be used to improve a robotics control application that controls one or more autonomous or semi-autonomous vehicles or machines.

The systems and methods described herein may be used for a variety of purposes, by way of example and without limitation, for use in systems associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an infotainment or plug-in gaming/streaming system of an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as large language models (LLMs) that may process textual, audio, image, and/or sensor data to generate outputs, systems for performing light transport simulation, systems for performing collaborative content creation for 3D assets, systems for performing one or more generative AI operations, systems implemented at least partially using cloud computing resources, and/or other types of systems.

System Overview

FIG. 1 illustrates a block diagram of a system 100 configured to implement one or more aspects of at least one embodiment. As shown, the system 100 includes a cloud computing system 110 and actors 170, 180, and 190. As used herein, an actor refers to an object within a physical environment in which a robotics mission is performed using one or more robots. Examples of actors include robots, obstacles, charging stations, humans, etc. An example of a robotics mission is delivering an object in a factory, warehouse, laboratory, or outdoor environment. Although three actors 170, 180, and 190 are shown for illustrative purposes, in at least one embodiment, a physical environment can include any number of actors. As used herein, a robotics mission may refer to a series of (one or more) tasks required to accomplish a goal, and a robotics mission can include navigation information for one or more robots and a behavior tree that indicates what is to be accomplished, the order (or ordering options) in which tasks are performed, and the handling of error conditions. In the case of navigation, the behavior tree can include an entire route for one or more robots.

In at least one embodiment, the cloud computing system 110 includes multiple interconnected compute nodes (not shown), each of which includes processing, memory, network, and storage resources that can be utilized by applications running on those compute nodes within the cloud computing system 110. Exemplar components of a compute node are described in greater detail in conjunction with FIG. 2. As shown in FIG. 1, a robotics control application 120, a communication interface 130, a simulation application 160, and a model trainer 155 run on one or more compute nodes within the cloud computing system 110. Each of the robotics control application 120, the communication interface 130, the simulation application 160, and/or the model trainer 155 can run on a single compute node or across multiple compute nodes of the cloud computing system 110. In at least one embodiment, the robotics control application 120, the communication interface 130, and the simulation application 160 can be implemented as microservices that run on compute nodes of the cloud computing system 110. In at least one alternative embodiment, the functionality of each application can be distributed across any number of other applications in any combination, or the functionality of any number of applications or subsystems may be consolidated into a single application or subsystem.

In particular, in at least one embodiment, the robotics control application 120 is a decision-making application that is configured to generate robotics missions and to coordinate one or more robots to perform the generated missions while providing collective intelligence to the one or more robots. In at least one embodiment, robotics missions can be generated according to templates that specify the steps within each mission, and each mission template can be repeatedly used to instantiate missions. For example, in at least one embodiment, given a template for a mission to instantiate, the robotics control application 120 can generate a unique identifier (ID) for the mission, look up the mission template in a data store, generate a map of the physical environment, bias edges of a graph that is used to solve for routes across the map that one or more robots can use to perform the mission based on traffic information, solve for an optimal route for each navigation task in the template, create a behavior tree for each route and append the behavior tree to each navigation task, store the created mission in a data store, and transmit the mission to the communication interface 130 for execution by one or more robots. In at least one embodiment, the robotics control application 120 is further configured to receive events from actors that participate in a robotics mission and to generate robot control decisions based on the received events. For example, the robot control decisions could include updates and optimizations to the robotics mission and/or decisions on how to handle the received events.

As shown, each of the actors 180 and 190 is a robot that participates in a robotics mission and transmits events to the robotics control application 120 via the communication interface 130. In at least one embodiment, the events can be transmitted via any technically feasible network or networks, such as one or more of a wide area network (WAN) such as the Internet, a local area network (LAN), and/or any other suitable network. In at least one embodiment, each event includes a timestamp and updated information associated with an actor. Illustratively, a client application 182 and 192 runs on each of the actors 180 and 190, respectively. Each client application 182 and 192 can generate decisions, such as detecting objects from sensor data, and transmit events indicating the decisions to the robotics control application 120. Other examples of actors that can transmit events to the robotics control application 120 include a human pressing a button that triggers an event, a door closing that triggers an event, etc.

The communication interface 130 is an edge gateway between applications running in the cloud computing system 110, including the robotics control application 120, and actors, such as the actors 180 and 190, that communicate with the applications via the communication interface 130. It should be noted that some actors, such as the actor 170, may not communicate with the communication interface 130. Actors that communicate with the communication interface 130 do not need to be aware of specific pieces of software running in the cloud computing system 110, such as microservices that implement the robotics control application 120 and/or other applications. In at least one embodiment, in response to receiving events from actors, the communication interface persists the events in a log. The logged events can be used to replay decisions made by the robotics control application via simulations. During the simulation of a particular mission, the simulation application 160 reads events associated with the particular mission and transmits the events to the communication interface as new events. In turn, the communication interface 130 forwards the events to the robotics control application 120, which generates decisions on how to handle the events. Returning to the example in which a received event indicates that an object has been detected from sensor data, the robotics control application 120 could generate a decision to stop a robot that transmitted the event so as to avoid the object, or the robotics control application 120 could generate a decision to advance despite the object.

In addition to forwarding received events to the robotics control application 120, the communication interface 130 also persists the events in a log 150. The log 150 can be implemented in any technically feasible data store or data stores, such as the storage provided by one or more compute nodes of the cloud computing system 110, one or more network attached storages (NASes), one or more storage area networks (SANs), and/or the like. Subsequently, the simulation application 160 can receive a command to simulate a previously executed robotics mission or portion thereof. After receiving such a command, the simulation application 160 reads events associated with the mission or portion thereof from the log 150, and the simulation application 160 transmits the events that are read from the log 150 to the communication interface 130, which again forwards those events to the robotics control application 120. In turn, the robotics control application 120 generates decisions on how to handle the events that can be analyzed to debug and/or otherwise modify the robotics control application 120, as discussed in greater detail herein at least with respect to FIGS. 3-5.

In at least one embodiment, in addition to replaying missions or portions thereof, events that are persisted in the log 150 can be used to train machine learning models, such as machine learning models that control robots or machine learning models that detect errors in robotics missions. In at least one embodiment, a machine learning model 122 can be trained to generate robot control decisions using training data that includes the logged events and the stored mission status information, as discussed in greater detail herein at least with respect to FIGS. 3 and 6. The training can begin with an untrained model, or, alternatively, the training can refine a previously trained model. The mission status information is generated by the robotics control application 120 to record whether missions and/or tasks (or sub-tasks) thereof have succeeded or failed, and the mission status information is stored in a database 140. Similar to the log 150, the database 140 can be implemented in any technically feasible data store or data stores, such as the storage provided by one or more compute nodes of the cloud computing system 110, one or more network attached storages (NASes), one or more storage area networks (SANs), and/or the like. Once trained, the machine learning model 122 can be deployed to the robotics control application 120 to generate missions to control robots and/or to generate decisions to handle events received from actors during missions.

Figure 3:
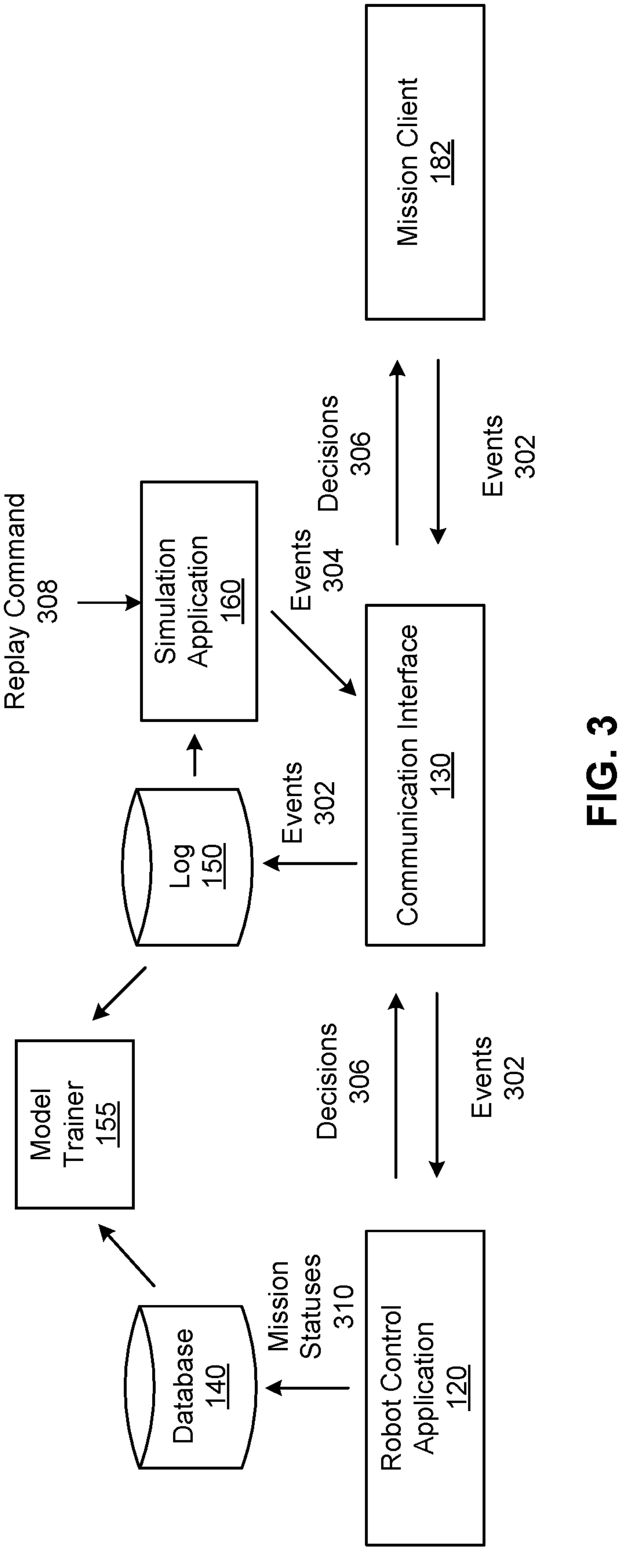
FIG. 3 illustrates how events can be logged and replayed in the system of FIG. 1, according to at least one embodiment.
Figure 7:
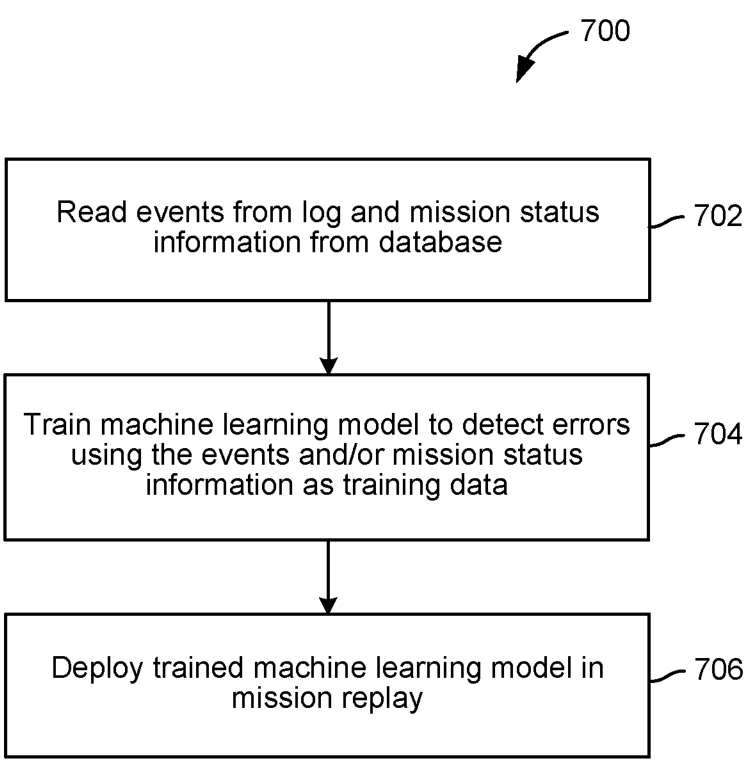
FIG. 7 illustrates a flow diagram of a process for training a machine learning model to detect errors during robotics missions, according to at least one embodiment.

In addition, in at least one embodiment, a machine learning model 162 can be trained to detect errors that cause mission failures using training data that includes stored events and stored mission status information, as discussed in greater detail herein at least with respect to FIGS. 3 and 7. Once trained, the machine learning model 162 can be deployed to the simulation application 160 to detect errors and simulate missions or portions thereof associated with the errors so that the robotics control application 120 can be debugged to correct the errors and/or otherwise modified.

Figure 2:
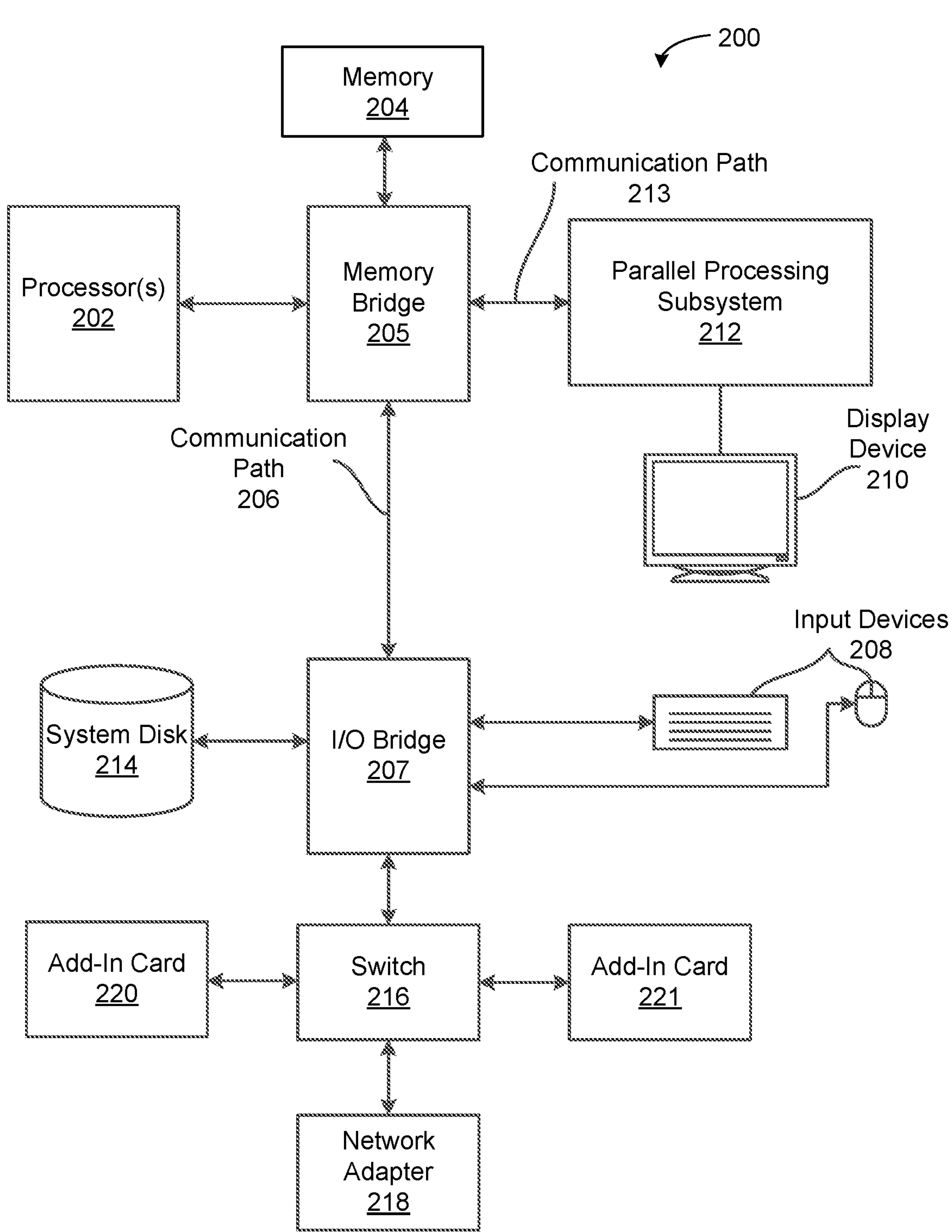
FIG. 2 illustrates a compute node that can be included in the cloud computing system of FIG. 1, according to various embodiments.

FIG. 2 illustrates a compute node 200 that can be included in the cloud computing system 110 of FIG. 1, according to various embodiments. The compute node 200 can include any type of computing system, including, without limitation, a server machine, a server platform, a desktop machine, a laptop machine, a hand-held/mobile device, a digital kiosk, an in-vehicle infotainment system, and/or a wearable device. In at least one embodiment, the compute node 200 is a server machine operating in a data center or a cloud computing environment that provides scalable computing resources as a service over a network. In at least one embodiment, actors, such as the actor 180 and the actor 190, can include one or more similar components as the compute node.

In various embodiments, the compute node 200 includes, without limitation, processor(s) 202 and memory (ies) 204 coupled to a parallel processing subsystem 212 via a memory bridge 205 and a communication path 213. The memory bridge 205 is further coupled to an I/O (input/output) bridge 207 via a communication path 206, and I/O bridge 207 is, in turn, coupled to a switch 216.

In one embodiment, the I/O bridge 207 is configured to receive user input information from optional input devices 208, such as a keyboard, mouse, touch screen, sensor data analysis (e.g., evaluating gestures, speech, or other information about one or more uses in a field of view or sensory field of one or more sensors), and/or the like, and forward the input information to the processor(s) 202 for processing. In at least one embodiment, the compute node may be a server machine in a cloud computing environment. In such embodiments, the compute node may not include input devices 208, but may receive equivalent input information by receiving commands (e.g., responsive to one or more inputs from a remote computing device) in the form of messages transmitted over a network and received via the network adapter 218. In at least one embodiment, the switch 216 is configured to provide connections between I/O bridge 207 and other components of the compute node, such as a network adapter 218 and various add-in cards 220 and 221.

In at least one embodiment, the I/O bridge 207 is coupled to a system disk 214 that may be configured to store content and applications and data for use by the processor(s) 202 and the parallel processing subsystem 212. In one embodiment, the system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to the I/O bridge 207 as well.

In various embodiments, the memory bridge 205 may be a Northbridge chip, and the I/O bridge 207 may be a Southbridge chip. In addition, the communication paths 206 and 213, as well as other communication paths within the compute node, may be implemented using any technically suitable protocols, including, without limitation, AGP (Accelerated Graphics Port), HyperTransport, or any other bus or point-to-point communication protocol known in the art.

In at least one embodiment, the parallel processing subsystem 212 comprises a graphics subsystem that delivers pixels to an optional display device 210 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. As described in greater detail herein at least with respect to FIGS. 2-3, such circuitry may be incorporated across one or more parallel processing units (PPUs), also referred to herein as parallel processors, included within the parallel processing subsystem 212.

In at least one embodiment, the parallel processing subsystem 212 incorporates circuitry optimized (e.g., that undergoes optimization) for general purpose and/or compute processing. Again, such circuitry may be incorporated across one or more PPUs included within the parallel processing subsystem 212 that are configured to perform such general purpose and/or compute operations. In yet other embodiments, the one or more PPUs included within the parallel processing subsystem 212 may be configured to perform graphics processing, general purpose processing, and/or compute processing operations. The system memory 204 includes at least one device driver configured to manage the processing operations of the one or more PPUs within the parallel processing subsystem 212. In addition, the system memory 204 includes the model trainer 155. Although described herein with respect to the model trainer 155, techniques disclosed herein can also be implemented, either entirely or in part, in other software and/or hardware, such as in the parallel processing subsystem 212.

In various embodiments, the parallel processing subsystem 212 may be integrated with one or more of the other elements of FIG. 2 to form a single system. For example, the parallel processing subsystem 212 may be integrated with processor 212 and other connection circuitry on a single chip to form a system on a chip (SoC).

In at least one embodiment, the processor(s) 212 includes the primary processor of compute node, controlling and coordinating operations of other system components. In at least one embodiment, the processor(s) 212 issues commands that control the operation of PPUs. In at least one embodiment, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in at least one embodiment, system memory 204 could be connected to the processor(s) 202 directly rather than through the memory bridge 205, and other devices may communicate with the system memory 204 via the memory bridge 205 and the processor 202. In other embodiments, the parallel processing subsystem 212 may be connected to the I/O bridge 207 or directly to the processor 202, rather than to the memory bridge 205. In still other embodiments, the I/O bridge 207 and the memory bridge 205 may be integrated into a single chip instead of existing as one or more discrete devices. In certain embodiments, one or more components shown in FIG. 2 may not be present. For example, the switch 216 could be eliminated, and the network adapter 218 and the add-in cards 220, 221 would connect directly to the I/O bridge 207. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in at least one embodiment. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Replaying and Learning from Robotics Mission Events

FIG. 3 illustrates how events can be logged and replayed in the system 100 of FIG. 1, according to at least one embodiment. As shown, the client application 182 transmits events 302 to the communication interface 130, which forwards the events 302 to the robotics control application 120. As described, the communication interface 130 is an edge gateway between applications running in the cloud computing system 110, such as the robotics control application 120, and actors in an environment, such as robots on which client applications (e.g., client application 182) execute.

Each of the actors participating in a robotics mission can transmit events, such as the events 302, to the communication interface 130. In at least one embodiment, the actors can post messages that include the events to an event stream, in which successive events are transmitted periodically (e.g., every few seconds), and the robotics control application 120 can listen for such messages. In at least one embodiment, each event includes a timestamp and updated information associated with the actor. The updated information can include a state (e.g., a location, velocity, current load, current step of a mission) of the actor that can be identified in any suitable manner (e.g., by an actor ID and/or an IP address), a decision made by the actor, and/or a reason for making a decision. In at least one embodiment, the updated information can include predefined types of information that the robotics control application 120 understands. One example of a decision that an actor can make is detecting an object or a particular type of object using an object detection machine learning model. In such a case, the actor can transmit an event that indicates the detected object or type of object to the communication interface 130. Notably, perception data (e.g., image or LIDAR data) that was used to make the object detection, which can be very large in size, is not transmitted to the communication interface 130. Another example of an event is the pressing of a button after a user loads an object onto a robot. In such a case, the user can also input a reason for making the decision to load the object onto the robot, and the reason can be included as metadata in the event.

Illustratively, the communication interface 130 listens to messages, including messages indicating events that are received from actors participating in a robotics mission and messages from applications running in the cloud computing system 110, such as the robotics control application 120 and the simulation application 160. The communication interface 130 forwards events (e.g., event 302) that are received from actors to the robotics control application 120. The robotics control application 120 is configured to generate missions for one or more robots. Each mission can include a number of steps or operations (including sub-steps and/or sub-operations) that one or more robots can perform to achieve an objective. The robotics control application 120 transmits the missions via the communication interface 130 to the robots, which then perform the missions. For example, the missions could be generated and executed during nightly quality assurance (QA) tests, and failed tests can be used to debug the robotics control application 120. In addition to generating missions, the robotics control application 120 is configured to receive and handle asynchronous events from robots that perform the missions and/or other actors that participate in the missions. Returning to the example event in which an object is detected by a robot, the robotics control application 120 could determine whether the robot should advance or stop given the detected object. In such a case, the robotics control application 120 can make the determination in any technically feasible manner, such as according to programming of the robotics control application 120 or using a trained machine learning model. The robot control 120 then transmits the determination, shown as decision 306, via the communication interface 130 to the robots, which then perform actions according to the decision 306.

In addition to forwarding events received from various actors to the robotics control application 120, the communication interface 130 also persists received events (e.g., the events 302) in the log 150. As described, the events do not include raw sensor data, which can be very large in size. As a result, the log 150 can also be relatively small in size. For example, the log 150 can be a few kilobytes or megabytes in size, as opposed to sensor data that can be many gigabytes in size.

Events that are stored in the log 150 can be used in simulations to replay decisions made by the robotics control application 120. Illustratively, in response to receiving a command 308 from a user to replay a mission or portion thereof, the simulation application 160 reads events 304 associated with the mission or portion thereof from the log 150 and transmits the read events 304 to the communication interface. In at least one embodiment, the events 304 can be transmitted in a same order and at a same cadence that the events were received from actors, as indicated by time-stamps included in the events. In at least one other embodiment, the events 304 can be transmitted in a different order and/or cadence than the events were received from actors. Transmitting the read events 304 to the communication interface simulates the same events 304 being received again by the communication interface, which forwards the events 304 to the robotics control application 120 that generates decisions based on the events 304. The generated decisions can then be analyzed, either manually or automatically, to debug or otherwise modify the robotics control application 120. Notably, neither sensor data that is very large in size nor very precise timing information are required to perform the simulations and reproduce robotics mission failures. Instead, the simulations are based on state changes indicated by events that are received from actors.

In at least one embodiment, each simulation begins from an initial state of actors within an environment. As used herein, the initial state of actors includes the position and orientation of the actors within a physical environment prior to a robotics mission. In such cases, logged events can be added to the initial state during the simulation. In some other embodiments, a simulation can begin from a known state that is not the initial state. In such cases, logged events can be added to the known state during the simulation.

In at least one embodiment, simulations can be triggered when robotics missions and/or steps (or sub-steps) or operations (or sub-operations) thereof fail. For example, when one of the steps or operations of a mission is not successfully performed, such as when the route a robot takes during a mission or step or operation thereof deviates from an expected route, or the like, the failure can be ranked/triaged and automatically added to a queue of simulations to be performed.

In at least one embodiment, errors that cause missions and/or steps thereof to fail can be detected automatically using a trained machine learning model. In such cases, the model trainer 155 can train the machine learning model using training data that includes events stored in the log 150 and/or statuses 310 of missions and/or steps or operations thereof that are stored in the database 140. The training can include supervised or unsupervised learning. As an example of supervised learning, in at least one embodiment, the training data can include examples of errors (or successful and unsuccessful missions and/or steps or operations thereof), as identified by a user, as well as sequences of events that led to the errors (or successful and unsuccessful missions and/or steps or operations thereof). Using such training data, the machine learning model can be trained to predict whether an error will occur (or a mission or step or operation thereof will be successful or unsuccessful) based on a received sequence of events. As an example of unsupervised learning, in at least one embodiment, unlabeled data that includes sequences of events and the statuses of missions or steps or operations thereof can be used to fine tune a pre-trained large language model (LLM) to learn what an error is and be able to identify errors in a sequence of events.

In at least one embodiment, a machine learning model (e.g., machine learning model 122) can be trained to perform robot control functionality using training data that includes events stored in the log 150 and/or statuses of missions and/or steps or operations thereof that are stored in the database 140. For example, in at least one embodiment, missions can be specified in a human-understandable grammar. In such cases, the mission specifications, as well as mission telemetry and other event data from robots and mission success rates, can be included in training data that is used to train an LLM that can generate, or be used to generate, more optimal missions in terms of the robots to use, routes, times to perform the missions, etc. For example, the LLM could be trained to better bias the edges of a graph that is used to solve for routes that one or more robots can use to perform a mission. As another example, the LLM could be queried on when and/or how to perform a mission. As a specific example, if the LLM learns that congestion is more frequent during certain times of the day, then the LLM could generate a mission that occurs at other times of the day.

Figure 4:
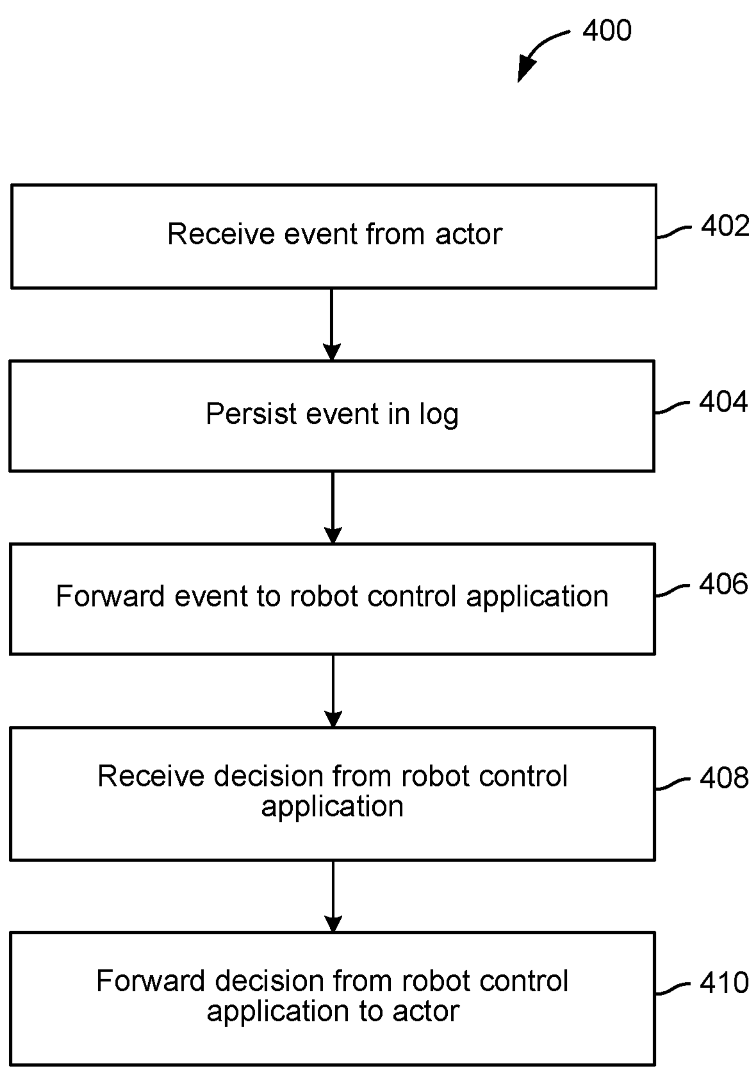
FIG. 4 illustrates a flow diagram of a process for logging events in a robotics control system, according to at least one embodiment.

FIG. 4 illustrates a flow diagram of a process for logging events in a robot control system, according to at least one embodiment. Although the process is described in conjunction with the systems of FIGS. 1-3, persons skilled in the art will understand that any system configured to perform the process in any order falls within the scope of the present embodiments.

As shown, the process 400 begins at operation 402, where the communication interface 130 receives an event from an actor. As described, in at least one embodiment, the event can include a timestamp and updated information associated with the actor, such as a state (e.g., a location, velocity, current load, current step of a mission) of the actor that is identified in any suitable manner (e.g., by an actor ID and/or an IP address), a decision made by the actor, and/or a reason for making a decision.

At operation 404, the communication interface 130 persists the events in the log 150. In addition, at operation 406, the communication interface 130 forwards the events to the robotics control application 120 that generates decisions on how to handle the events.

At operation 408, the communication interface 130 receives a decision from robotics control application 120 on how to handle the event. Returning to the example in which the event is the detection of an object, the decision could be to stop a robot that detected the object or to advance despite the object.

At operation 410, the communication interface 130 forwards the decision from the robotics control application 120 to the actor from which the event was received at operation 402. Returning to the example in which the event is the detection of an object, the communication interface 130 could forward a decision, which can be in the form of a command to stop or advance, from the robotics control application 120 to the robot that detected the object.

Figure 5:
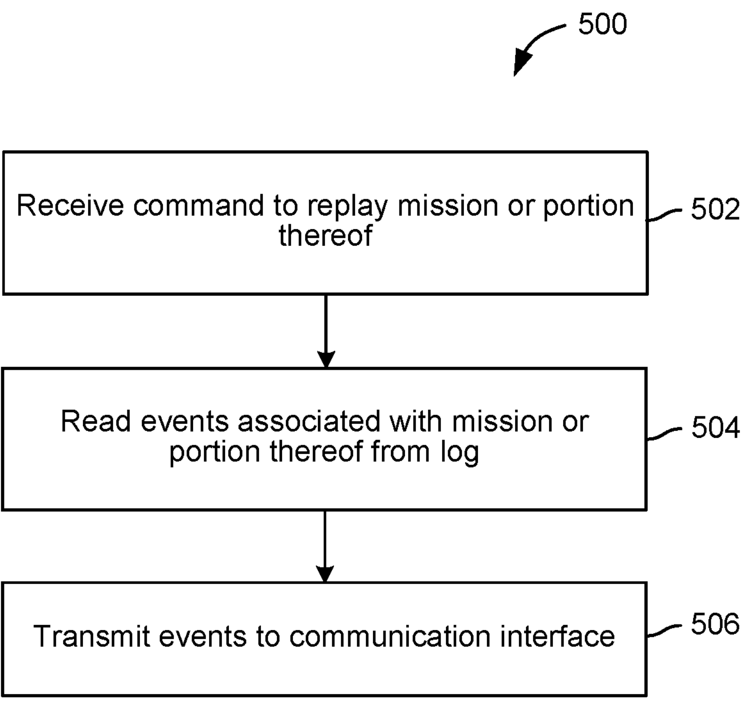
FIG. 5 illustrates a flow diagram of a process for replaying events in a robotics control system, according to at least one embodiment.

FIG. 5 illustrates a flow diagram of a process for replaying events in a robot control system, according to at least one embodiment. Although the process is described in conjunction with the systems of FIGS. 1-3, persons skilled in the art will understand that any system configured to perform the process in any order falls within the scope of the present embodiments.

As shown, the process 500 begins at operation 502, where the simulation application 160 receives a user command to replay a mission or portion thereof. The command can be received in any technically feasible manner, such as via a user interface. In at least one embodiment, in addition to or in lieu of a user command, simulations can be triggered when a robotics mission and/or step or operation thereof fails. For example, in at least one embodiment, when one of the steps or operations of a mission is not successfully performed, the route a robot takes during a mission or step or operation thereof deviates from an expected route, or the like, the failure can be ranked/triaged and automatically added to a queue of simulations to be performed.

At operation 504, the simulation application 160 reads events associated with the mission or portion thereof from the log 150. As described, the log 150 stores events received from actors during robotics missions.

At operation 506, the simulation application 160 transmits the events to the communication interface 130. In at least one embodiment, the events can be transmitted in a same order and at a same cadence that the events were received from actors, as indicated by timestamps included in the events. In at least one other embodiment, the events can be transmitted in a different order and/or cadence than the events were received from actors. The communication interface 130 can then forward the events to the robotics control application 120 that generates decisions on how to handle the events, and the decisions can be analyzed, either manually or automatically, to debug and/or otherwise modify the robotics control application 120.

Figure 6:
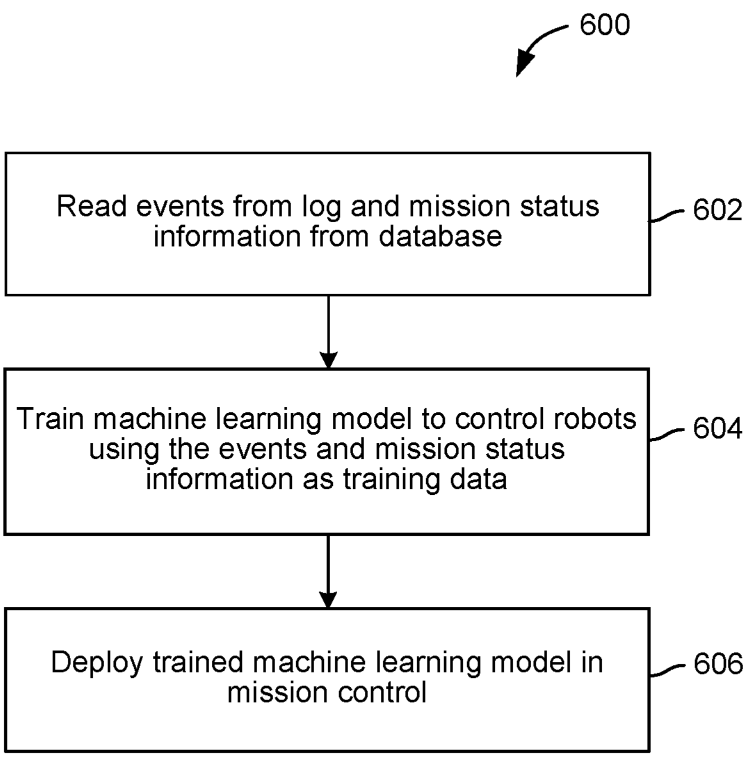
FIG. 6 illustrates a flow diagram of a process for training a machine learning model to control robots or other machines, according to at least one embodiment.

FIG. 6 illustrates a flow diagram of a process for training a machine learning model to control robots or other machines, according to at least one embodiment. Although the process is described in conjunction with the systems of FIGS. 1-3, persons skilled in the art will understand that any system configured to perform the process in any order falls within the scope of the present embodiments.

As shown, the process 600 begins at operation 602, where the model trainer 155 reads events from the log 150 and mission status information from the database 140. The mission status information can include the termination statuses of missions and/or steps (or sub-steps) or operations thereof, including whether the missions and/or steps thereof succeeded or failed.

At operation 604, the model trainer 155 trains a machine learning model using the event and mission status information as training data. Any technically feasible machine learning model can be trained, and the training can begin with an untrained model, or, alternatively, the training can refine a previously trained model. For example, in at least one embodiment, the machine learning model can be an artificial neural network, such as an LLM. Further, the machine learning model can be trained in any technically feasible manner (e.g., via backpropagation and gradient descent) to generate any suitable output in at least one embodiment. For example, in at least one embodiment, the machine learning model can be trained to generate more optimal robotics missions or to better handle events that are received from actors during robotics missions, as described herein at least with respect to FIG. 3.

At operation 606, the model trainer 155 deploys the trained machine learning model in the robotics control application 120. Once deployed, the robotics control application 120 can use the trained machine learning model to generate missions for robots and/or handle events that are received from actors during missions.

FIG. 7 illustrates a flow diagram of a process for training a machine learning model to detect errors during robotics missions, according to at least one embodiment. Although the process is described in conjunction with the systems of FIGS. 1-3, persons skilled in the art will understand that any system configured to perform the process in any order falls within the scope of the present embodiments.

As shown, the process 700 begins at operation 702, where the model trainer 155 reads events from the log 150 and mission status information from the database 140. The mission status information can include the termination statuses of missions and/or steps thereof, including whether the missions and/or steps thereof succeeded or failed.

At operation 704, the model trainer 155 trains a machine learning model to detect errors using the event and mission status information as training data. Any technically feasible machine learning model can be trained, and the training can begin with an untrained model or refine a previously trained model. For example, in at least one embodiment, the machine learning model can be an artificial neural network, such as an LLM, that is trained via the supervised or unsupervised learning techniques described herein at least with respect to FIG. 3.

At operation 706, the model trainer 155 deploys the trained machine learning model in the simulation application 160. Once deployed, the simulation application 160 can use the trained machine learning model to detect errors during robotics missions and simulate those missions and/or portions thereof using stored events, as described herein at least with respect to FIGS. 3 and 5.

At least one technical advantage of the disclosed techniques relative to the prior art is that, with the disclosed techniques, a robotics control application can be debugged and/or otherwise modified without requiring sensor data that is very large in size or very precise timing information. As a result, the disclosed techniques permit nightly QA testing of the robotics control application, automatic addition of test cases to regression libraries, and, due to improved performance, testing numerous scenarios in parallel. These technical advantages represent one or more technological improvements over prior art approaches.

Inference and Training Logic

Figure 8A:
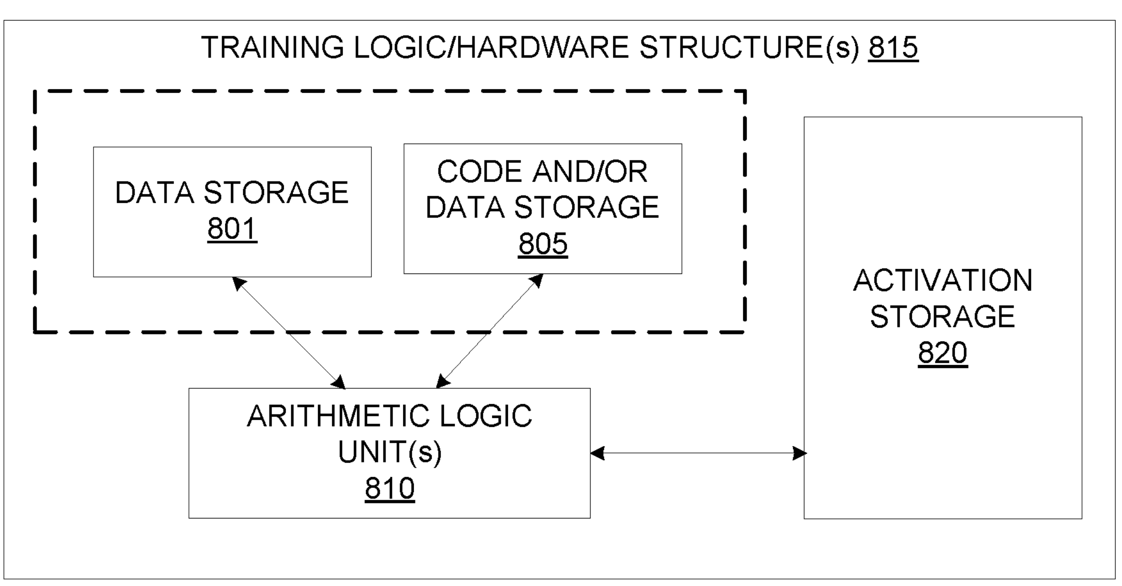
FIG. 8A illustrates inference and/or training logic, according to at least one embodiment.

FIG. 8A illustrates inference and/or training logic 815 used to perform inferencing and/or training operations associated with one or more embodiments. Details regarding inference and/or training logic 815 are provided below in conjunction with at least FIGS. 8A and/or 8B.

In at least one embodiment, inference and/or training logic 815 may include, without limitation, code and/or data storage 801 to store forward and/or output weight and/or input/output data, and/or other parameters to configure neurons or layers of a neural network trained and/or used for inferencing in aspects of one or more embodiments. In at least one embodiment, training logic 815 may include, or be coupled to code and/or data storage 801 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 801 may be included with other on-chip or off-chip data storage, including a processor's L1, L2, or L3 cache or system memory.

In at least one embodiment, any portion of code and/or data storage 801 may be internal or external to one or more processors or other hardware logic devices or circuits. In at least one embodiment, code and/or code and/or data storage 801 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 801 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a code and/or data storage 805 to store backward and/or output weight and/or input/output data corresponding to neurons or layers of a neural network trained and/or used for inferencing in aspects of one or more embodiments. In at least one embodiment, code and/or data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 815 may include, or be coupled to code and/or data storage 805 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 805 may be included with other on-chip or off-chip data storage, including a processor's L1, L2, or L3 cache or system memory. In at least one embodiment, any portion of code and/or data storage 805 may be internal or external to one or more processors or other hardware logic devices or circuits. In at least one embodiment, code and/or data storage 805 may be cache memory, DRAM, SRAM, non-volatile memory (e.g., flash memory), or other storage. In at least one embodiment, a choice of whether code and/or data storage 805 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 801 and code and/or data storage 805 may be separate storage structures. In at least one embodiment, code and/or data storage 801 and code and/or data storage 805 may be a combined storage structure. In at least one embodiment, code and/or data storage 801 and code and/or data storage 805 may be partially combined and partially separate. In at least one embodiment, any portion of code and/or data storage 801 and code and/or data storage 805 may be included with other on-chip or off-chip data storage, including a processor's L1, L2, or L3 cache or system memory.

In at least one embodiment, inference and/or training logic 815 may include, without limitation, one or more arithmetic logic unit(s) ("ALU(s)") 810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 820 that are functions of input/output and/or weight parameter data stored in code and/or data storage 801 and/or code and/or data storage 805. In at least one embodiment, activations stored in activation storage 820 are generated according to linear algebraic and or matrix-based mathematics performed by ALU(s) 810 in response to performing instructions or other code, wherein weight values stored in code and/or data storage 805 and/or data storage 801 are used as operands along with other values, such as bias values, gradient information, momentum values, or other parameters or hyperparameters, any or all of which may be stored in code and/or data storage 805 or code and/or data storage 801 or another storage on or off-chip.

In at least one embodiment, ALU(s) 810 are included within one or more processors or other hardware logic devices or circuits, whereas in another embodiment, ALU(s) 810 may be external to a processor or other hardware logic device or circuit that uses them (e.g., a coprocessor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 801, code and/or data storage 805, and activation storage 820 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., flash memory), or other storage. In at least one embodiment, activation storage 820 may be completely or partially within or external to one or more processors or other logical circuits. In at least one embodiment, a choice of whether activation storage 820 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 illustrated in FIG. 8A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8A may be used in conjunction with central processing unit ("CPU") hardware, graphics processing unit ("GPU") hardware or other hardware, such as field programmable gate arrays ("FPGAs").

Figure 8B:
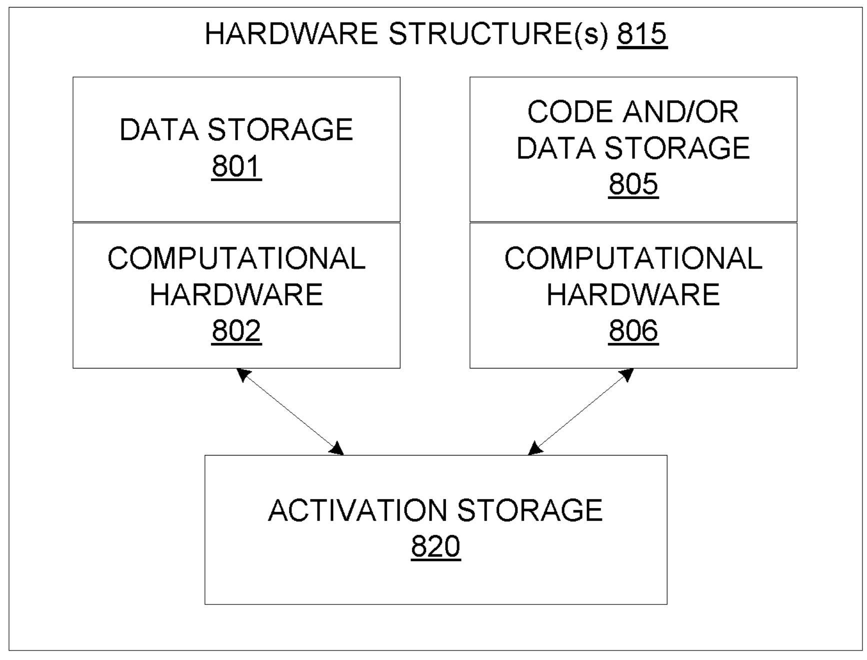
FIG. 8B illustrates inference and/or training logic, according to at least one embodiment.

FIG. 8B illustrates inference and/or training logic 815, according to at least one embodiment. In at least one embodiment, inference and/or training logic 815 may include, without limitation, hardware logic in which computational resources are dedicated or otherwise exclusively used in conjunction with weight values or other information corresponding to one or more layers of neurons within a neural network. In at least one embodiment, inference and/or training logic 815 illustrated in FIG. 8B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8B may be used in conjunction with central processing unit (CPU) hardware, graphics processing unit (GPU) hardware or other hardware, such as field programmable gate arrays (FPGAs). In at least one embodiment, inference and/or training logic 815 includes, without limitation, code and/or data storage 801 and code and/or data storage 805, which may be used to store code (e.g., graph code), weight values and/or other information, including bias values, gradient information, momentum values, and/or other parameter or hyperparameter information. In at least one embodiment illustrated in FIG. 8B, each of code and/or data storage 801 and code and/or data storage 805 is associated with a dedicated computational resource, such as computational hardware 802 and computational hardware 806, respectively. In at least one embodiment, each of computational hardware 802 and computational hardware 806 comprises one or more ALUs that perform mathematical functions, such as linear algebraic functions, only on information stored in code and/or data storage 801 and code and/or data storage 805, respectively, result of which is stored in activation storage 820.

In at least one embodiment, each of code and/or data storage 801 and 805 and corresponding computational hardware 802 and 806, respectively, correspond to different layers of a neural network, such that resulting activation from one storage/computational pair 801/802 of code and/or data storage 801 and computational hardware 802 is provided as an input to a next storage/computational pair 805/806 of code and/or data storage 805 and computational hardware 806, in order to mirror a conceptual organization of a neural network. In at least one embodiment, each of storage/computational pairs 801/802 and 805/806 may correspond to more than one neural network layer. In at least one embodiment, additional storage/computation pairs (not shown) subsequent to or in parallel with storage/computation pairs 801/802 and 805/806 may be included in inference and/or training logic 815.

Neural Network Training and Deployment

Figure 9:
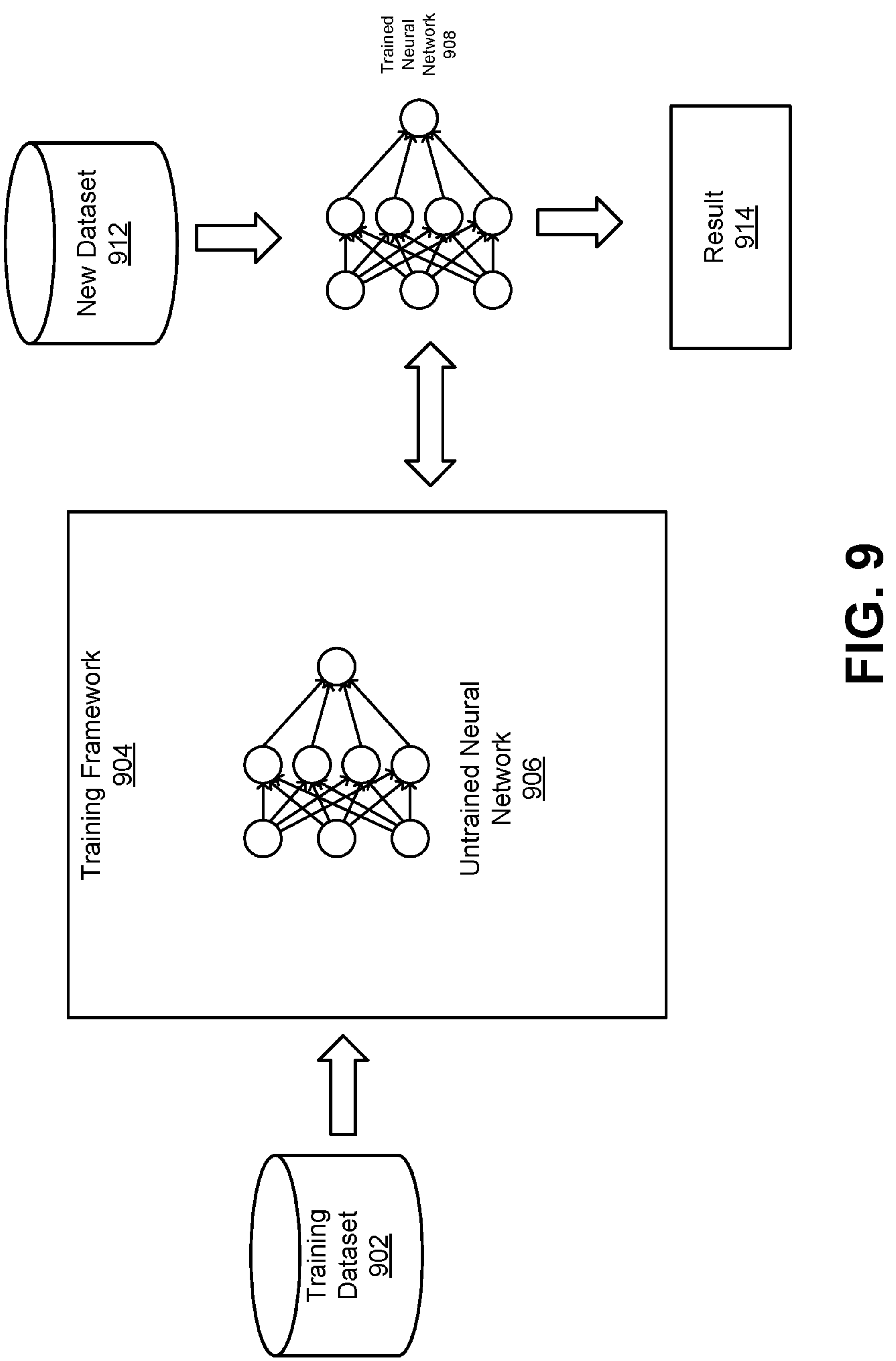
FIG. 9 illustrates training and deployment of a neural network, according to at least one embodiment.

FIG. 9 illustrates training and deployment of a deep neural network, according to at least one embodiment. In at least one embodiment, untrained neural network 906 is trained using a training dataset 902. In at least one embodiment, training framework 904 is a PyTorch framework, whereas in other embodiments, training framework 904 is a TensorFlow, Boost, Caffe, Microsoft Cognitive Toolkit/CNTK, MXNet, Chainer, Keras, Deeplearning4j, or other training framework. In at least one embodiment, training framework 904 trains an untrained neural network 906 and enables it to be trained using processing resources described herein to generate a trained neural network 908. In at least one embodiment, weights may be chosen randomly or by pre-training using a deep belief network. In at least one embodiment, training may be performed in either a supervised, partially supervised, or unsupervised manner.

In at least one embodiment, untrained neural network 906 is trained using supervised learning, wherein training dataset 902 includes an input paired with a desired output for an input, or where training dataset 902 includes input having a known output and an output of neural network 906 is manually graded. In at least one embodiment, untrained neural network 906 is trained in a supervised manner and processes inputs from training dataset 902 and compares resulting outputs against a set of expected or desired outputs. In at least one embodiment, errors are then propagated back through untrained neural network 906. In at least one embodiment, training framework 904 adjusts weights that control untrained neural network 906. In at least one embodiment, training framework 904 includes tools to monitor how well untrained neural network 906 is converging towards a model, such as trained neural network 908, suitable to generating correct answers, such as in result 914, based on input data such as a new dataset 912. In at least one embodiment, training framework 904 trains untrained neural network 906 repeatedly while adjust weights to refine an output of untrained neural network 906 using a loss function and adjustment algorithm, such as stochastic gradient descent. In at least one embodiment, training framework 904 trains untrained neural network 906 until untrained neural network 906 achieves a desired accuracy. In at least one embodiment, trained neural network 908 can then be deployed to implement any number of machine learning operations.

In at least one embodiment, untrained neural network 906 is trained using unsupervised learning, wherein untrained neural network 906 attempts to train itself using unlabeled data. In at least one embodiment, unsupervised learning training dataset 902 will include input data without any associated output data or "ground truth" data. In at least one embodiment, untrained neural network 906 can learn groupings within training dataset 902 and can determine how individual inputs are related to untrained dataset 902. In at least one embodiment, unsupervised training can be used to generate a self-organizing map in trained neural network 908 capable of performing operations useful in reducing dimensionality of new dataset 912. In at least one embodiment, unsupervised training can also be used to perform anomaly detection, which allows identification of data points in new dataset 912 that deviate from normal patterns of new dataset 912.

In at least one embodiment, semi-supervised learning may be used, which is a technique in which in training dataset 902 includes a mix of labeled and unlabeled data. In at least one embodiment, training framework 904 may be used to perform incremental learning, such as through transferred learning techniques. In at least one embodiment, incremental learning enables trained neural network 908 to adapt to new dataset 912 without forgetting knowledge instilled within trained neural network 908 during initial training.

In at least one embodiment, training framework 904 is a framework processed in connection with a software development toolkit such as an OpenVINO (Open Visual Inference and Neural network Optimization) toolkit. In at least one embodiment, an OpenVINO toolkit is a toolkit such as those developed by Intel Corporation of Santa Clara, CA.

In at least one embodiment, OpenVINO is a toolkit for facilitating development of applications, specifically neural network applications, for various tasks and operations, such as human vision emulation, speech recognition, natural language processing, recommendation systems, and/or variations thereof. In at least one embodiment, OpenVINO supports neural networks such as convolutional neural networks (CNNs), recurrent and/or attention-based neural networks, and/or various other neural network models. In at least one embodiment, OpenVINO supports various software libraries such as OpenCV. OpenCL, and/or variations thereof.

In at least one embodiment, OpenVINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, OpenVINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, OpenVINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, OpenVINO provides various software functions to execute a program on one or more devices. In at least one embodiment, OpenVINO provides various software functions to execute a program and/or portions of a program on different devices. In at least one embodiment, OpenVINO provides various software functions to, for example, run a first portion of code on a CPU and a second portion of code on a GPU and/or FPGA. In at least one embodiment, OpenVINO provides various software functions to execute one or more layers of a neural network on one or more devices (e.g., a first set of layers on a first device, such as a GPU, and a second set of layers on a second device, such as a CPU).

In at least one embodiment, OpenVINO includes various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using OpenVINO.

Other variations are within spirit of present disclosure. Thus, while disclosed techniques are susceptible to various modifications and alternative constructions, certain illustrated embodiments thereof are shown in drawings and have been described herein in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms “a” and “an” and “the” and similar referents in context of describing disclosed embodiments (especially in context of following claims) are to be construed to cover both singular and plural, unless otherwise indicated herein or clearly contradicted by context, and not as a definition of a term. Terms “comprising,” “having,” “including,” and “containing” are to be construed as open-ended terms (meaning “including, but not limited to,”) unless otherwise noted. “Connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term “set” (e.g., “a set of items”) or “subset” unless otherwise noted or contradicted by context, is to be construed as a nonempty collection comprising one or more members. Further, unless otherwise noted or contradicted by context, term “subset” of a corresponding set does not necessarily denote a proper subset of corresponding set, but subset and corresponding set may be equal.

Conjunctive language, such as phrases of form “at least one of A, B, and C,” or “at least one of A, B and C,” unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases “at least one of A, B, and C” and “at least one of A, B and C” refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or example language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

1. In some embodiments, a method comprises obtaining event information generated using one or more robots performing a mission, the event information indicating one or more determinations made using the one or more robots and based at least on sensor data, storing the event information in a log, and performing one or more operations to simulate generating one or more decisions to control the one or more robots based at least on the event information stored in the log.
2. The method of clause 1, wherein the performing the one or more operations to simulate the generating the one or more decisions comprises simulating the event information being received again.
3. The method of clauses 1 or 2, wherein the one or more determinations include one or more objects being detected based at least on the sensor data.
4. The method of any of clauses 1-3, wherein the event information indicates at least one of one or more actions performed using the one or more robots, one or more states of the one or more robots, or one or more reasons that one or more events occurred.
5. The method of any of clauses 1-4, wherein the obtaining and storing operations are performed using a communication interface between the one or more robots and a robotics control application that generates the one or more decisions to control the one or more robots.
6. The method of any of clauses 1-5, wherein the one or more operations to simulate the generating the one or more decisions begins from an initial state of the one or more robots.
7. The method of any of clauses 1-6, wherein the one or more operations to simulate the generating the one or more decisions begins from a state of the one or more robots subsequent to an initial state of the one or more robots.
8. The method of any of clauses 1-7, further comprising modifying a robotics control application that generates the one or more decisions based at least on the event information.
9. The method of any of clauses 1-8, further comprising performing one or more operations to train a machine learning model based at least on the event information.
10. The method of any of clauses 1-9, further comprising detecting an error during the mission based at least on the event information and a trained machine learning model.
11. The method of any of clauses 1-10, further comprising receiving additional event information generated using one or more actors participating in the mission, wherein the one or more actors are not robots.
12. The method of any of clauses 1-11, wherein the method is performed by a processor comprised in at least one of an infotainment system for an autonomous or semi-autonomous machine, a system for performing one or more simulation operations, a system for performing one or more digital twin operations, a system for performing light transport simulation, a system for performing collaborative content creation for 3D assets, a system for performing one or more deep learning operations, a system implemented using an edge device, a system implemented using the one or more robots, a system for generating or presenting virtual reality, augmented reality, or mixed reality content, a system for performing one or more conversational AI operations, a system implementing one or more large language models (LLMs), a system for generating synthetic data, a system for performing one or more generative AI operations, a system incorporating one or more virtual machines (VMs), a system implemented at least partially in a data center, or a system implemented at least partially using cloud computing resources.
13. In some embodiments, a method comprises receiving, at a communication interface between one or more robots and a robotics control application, event information indicating one or more determinations made using the one or more robots and based at least on sensor data, storing the event information in a log, and transmitting the event information that is stored in the log to the communication interface during one or more simulations.
14. The method of clause 13, wherein the one or more determinations include one or more objects being detected based at least on sensor data.
15. The method of clauses 13 or 14, wherein the event information indicates at least one of one or more actions performed using the one or more robots, one or more states of the one or more robots, or one or more reasons that one or more events occurred.

16. The method of any of clauses 13-15, further comprising modifying the robotics control application based at least on the event information.
17. The method of any of clauses 13-16, further comprising performing one or more operations to train a machine learning model to detect errors based at least on the event information.
18. The method of any of clauses 13-17, further comprising performing one or more operations to train a machine learning model to generate missions for controlling one or more robots based at least on the event information.
19. The method of any of clauses 13-18, wherein the machine learning model comprises a large language model (LLM).
20. In some embodiments, a system comprises one or more processors to perform one or more operations to simulate logged event information being received at a communication interface between one or more robots and a robotics control application, wherein the logged event information indicates one or more determinations made by the one or more robots based at least on sensor data.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as example forms of implementing the claims.

What is claimed is:

1. A method comprising:

coordinating, using a machine learned robotic control application, one or more robots to perform a mission;

obtaining event information from the one or more robots during performance of the mission by the one or more robots, the event information including (1) contextual information generated based at least on the one or more robots locally processing sensor data and (2) robot state information indicating a current state of the one or more robots;

storing the event information in a log;

replaying a sequence of events from the log based on an order and cadence in which the events were stored in the log to simulate generating one or more decisions to control the one or more robots; and updating the machine learned robotic control application based at least on results of the replaying.

2. The method of claim 1, wherein the performing the one or more operations to simulate the generating the one or more decisions comprises simulating the event information being received again.

3. The method of claim 1, wherein the one or more determinations include one or more objects being detected based at least on the sensor data.

4. The method of claim 1, wherein the event information indicates at least one of one or more actions performed using the one or more robots, one or more states of the one or more robots, or one or more reasons that one or more events occurred.

5. The method of claim 1, wherein the obtaining and storing operations are performed using a communication interface between the one or more robots and a robotics control application that generates the one or more decisions to control the one or more robots.

6. The method of claim 1, wherein the one or more operations to simulate the generating the one or more decisions begins from an initial state of the one or more robots.

7. The method of claim 1, wherein the one or more operations to simulate the generating the one or more decisions begins from a state of the one or more robots subsequent to an initial state of the one or more robots.

8. The method of claim 1, further comprising modifying a robotics control application that generates the one or more decisions based at least on the event information.

9. The method of claim 1, further comprising performing one or more operations to train a machine learning model based at least on the event information.

10. The method of claim 1, further comprising detecting an error during the mission based at least on the event information and a trained machine learning model.

11. The method of claim 1, further comprising receiving additional event information generated using one or more actors participating in the mission, wherein the one or more actors are not robots.

12. The method of claim 1, wherein the method is performed by a processor comprised in at least one of:

an infotainment system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using the one or more robots;

a system for generating or presenting virtual reality, augmented reality, or mixed reality content;

a system for performing one or more conversational AI operations;

a system implementing one or more large language models (LLMs);

a system for generating synthetic data;

a system for performing one or more generative AI operations;

a system incorporating one or more virtual machines (VMs);

a system implemented at least partially in a data center; or a system implemented at least partially using cloud computing resources.

13. A method comprising:

receiving, at a communication interface between one or more robots and a robotics control application, event information including (1) contextual information derived from sensor data generated based at least on the one or more robots locally processing sensor data and (2) robot state information indicating a current state of the one or more robots;

storing the event information in a log;

replaying a sequence of events from the log at the one or more robots, via the communication interface, during one or more simulations, based on an order and cadence in which the events were stored in the log; and updating the robotics control application based at least on results of the replaying.

14. The method of claim 13, wherein the one or more determinations include one or more objects being detected based at least on sensor data.

15. The method of claim 13, wherein the event information indicates at least one of one or more actions performed using the one or more robots, one or more states of the one or more robots, or one or more reasons that one or more events occurred.

16. The method of claim 13, further comprising modifying the robotics control application based at least on the event information.

17. The method of claim 13, further comprising performing one or more operations to train a machine learning model to detect errors based at least on the event information.

18. The method of claim 13, further comprising performing one or more operations to train a machine learning model to generate missions for controlling one or more robots based at least on the event information.

19. The method of claim 18, wherein the machine learning model comprises a large language model (LLM).

20. A system comprising:

at least one memory having executable instructions stored thereon; and one or more processors configured to execute the executable instructions in order to cause the system to:

replay, at one or more robots, logged event information being received at a communication interface between the one or more robots and a robotics control application, wherein the logged event information includes (1) contextual information generated based at least on the one or more robots locally processing sensor data and (2) robot state information indicating a current state of the one or more robots; and update a machine learned robotic control application based at least on results of the replaying.

* * * * *